(12) United States Patent
Mears et al.

(10) Patent No.: US 11,381,142 B2
(45) Date of Patent: Jul. 5, 2022

(54) ROTOR ASSEMBLY

(71) Applicant: GE AVIATION SYSTEMS LLC, Grand Rapids, MI (US)

(72) Inventors: John S. Mears, Cincinnati, OH (US); Austin Michael Cobert, West Chester, OH (US); Todd Eric Rook, Tipp City, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 356 days.

(21) Appl. No.: 16/298,131

(22) Filed: Mar. 11, 2019

(65) Prior Publication Data

US 2020/0295636 A1 Sep. 17, 2020

(51) Int. Cl.
H02K 15/02 (2006.01)
H02K 3/51 (2006.01)

(52) U.S. Cl.
CPC .............. H02K 15/02 (2013.01); H02K 3/51 (2013.01)

(58) Field of Classification Search
CPC ................................. H02K 15/02; H02K 3/51
USPC .......................................................... 29/598
See application file for complete search history.

(56) References Cited

U.S. PATENT DOCUMENTS

| 1,769,063 | A | * | 7/1930 | Kimman | H02K 3/51 310/270 |
| 2,683,233 | A | * | 7/1954 | Ruhl | H02K 3/51 310/85 |
| 5,118,979 | A | * | 6/1992 | Shih | H02K 3/51 310/214 |
| 5,430,340 | A | * | 7/1995 | Shih | H02K 3/51 310/214 |
| 5,457,870 | A | * | 10/1995 | Ganders | H02K 1/278 156/294 |
| 5,528,097 | A | | 6/1996 | Gardner et al. | |
| 6,864,617 | B1 | * | 3/2005 | Wang | H02K 3/51 310/214 |
| 6,879,083 | B2 | | 4/2005 | Doherty et al. | |
| 7,626,310 | B2 | | 12/2009 | Hellsten et al. | |
| 8,878,409 | B2 | | 11/2014 | Legros et al. | |
| 9,018,817 | B2 | | 4/2015 | Bradley | |
| 2009/0160281 | A1 | | 6/2009 | Rasmussen et al. | |
| 2016/0141929 | A1 | * | 5/2016 | Arimatsu | H02K 1/30 310/156.12 |

FOREIGN PATENT DOCUMENTS

| DE | 102006044767 A1 * | 4/2008 | ............. H02K 15/12 |
| DE | 102012205760 A1 * | 10/2013 | ............. H02K 15/12 |
| GB | 696760 | 3/1951 | |
| JP | 2006081367 A | 3/2006 | |

OTHER PUBLICATIONS

European Patent Office, Extended Search Report re Corresponding Application No. 20161609.1-1201, dated Jul. 15, 2020, 9 pages, Munich, Germany.

* cited by examiner

*Primary Examiner* — Peter Dungba Vo
*Assistant Examiner* — Jose K Abraham
(74) *Attorney, Agent, or Firm* — McGarry Bair PC

(57) ABSTRACT

A rotor assembly for an electric machine includes a cylindrical rotor core, a set of posts extending radially outward from the rotor core defining a set of slots between adjacent posts, a set of windings formed by conductive wire wound in the set of slots having end turns extending axially beyond the rotor core, and a retention case overlying the end turns.

13 Claims, 6 Drawing Sheets

ROTOR ASSEMBLY

BACKGROUND

Electric machines, such as electric motors or electric generators, are used in energy conversion. In the aircraft industry, it is common to find an electric motor having a combination of motor and generator modes, where the electric machine, in motor mode, is used to start an aircraft engine, and, depending on the mode, functions as a generator, too, to supply electrical power to the aircraft systems. Regardless of the mode, an electric machine typically includes a stator with windings that works in conjunction with a rotor that also has windings and is driven to rotate by a source of rotation, which for a generator can be a gas turbine engine or for a motor can be the stator.

BRIEF DESCRIPTION

In one aspect, the present disclosure relates to a rotor assembly for an electric machine, including a cylindrical rotor core defining a radially-facing seat, a set of posts extending radially outward from the rotor core defining a set of slots between adjacent posts, a set of windings formed by conductive wire wound in the set of slots having end turns extending axially beyond the rotor core, and a retention case defining a first retaining portion radially overlying the end turns and a second retaining portion axially overlying at least an axially-facing portion of the end turns, and wherein the retention case is received by the seat. A piloting of the retention case to the seat prevents imbalance of the set of windings during a rotation of the rotor assembly.

DETAILED DESCRIPTION

Figure 1:
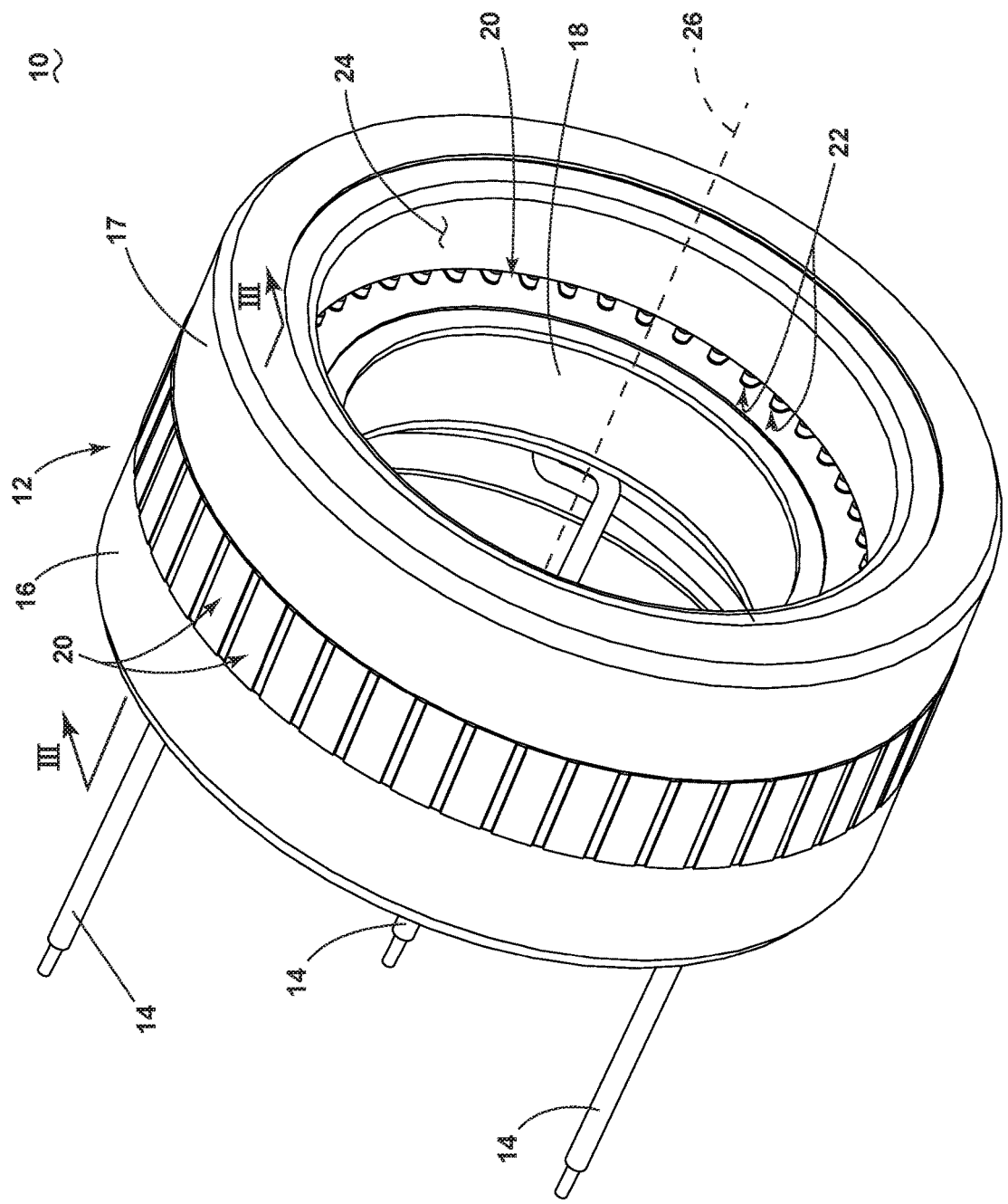
FIG. 1 is an isometric view of a rotor assembly in accordance with various aspects described herein.

Aspects of the disclosure can be implemented in any rotor assembly or electric machine assembly having a set of wound rotor slots. For purposes of this description, the rotor assembly is described with respect to an electric machine, electric machine assembly, generator, or similar language, which is meant to clarify that one or more stator/rotor combinations can be included in the machine. Non-limiting aspects of an electric machine can include an electric generator, an electric motor, a starter/generator, or the like.

While "a set of" various elements will be described, it will be understood that "a set" can include any number of the respective elements, including only one element. As used herein, the terms "axial" or "axially" refer to a dimension along a longitudinal axis of a referential component or along a longitudinal axis of a component disposed relative to the respective axis.

As used herein, the terms "radial" or "radially" refer to a dimension extending between a center longitudinal axis of a respective component, or a circular or annular component disposed relative to a respective component. All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

The exemplary drawings are for purposes of illustration only and the dimensions, positions, order and relative sizes reflected in the drawings attached hereto can vary.

FIG. 1 illustrates a rotor assembly 10 for an electric machine. For example, the rotor assembly 10 can include a rotor assembly 10 for an exciter, although aspects of the disclosure can be included in any rotor assembly 10. As shown, in one non-limiting example configuration, the rotor assembly 10 can include a generally ring-like a rotor core 18 defining a longitudinal axis 26, and an axis of rotor assembly 10 rotation. The rotor core 18 can further include a set of posts 20 or teeth extending from the core 18 radially outward away from the longitudinal axis 26. The set of posts 20 can further define a set of slots 22, such as openings, gaps, spaces, or the like, between adjacent posts 20. At least a subset of the slots 22 can be wound with a conductive wire or set of conductive wires to form a set of rotor windings 24, schematically illustrated in FIG. 1 as a continuous portion. It is understood that the set of rotor windings 24 are a set of wires, and not a continuous portion, and that the set of rotor windings 24 are illustrated as a continuous portion for ease of understanding. The set of rotor windings 24 can be conductively connected with a set of power outputs, schematically shown as a set of conductive output leads 14. The set of output leads 14 can electrically conduct current generated by, or in, a respective set or subset of the rotor windings 24, to another component of the electric machine (not shown).

The rotor assembly 10 is further shown including a set of retention cases 12, including a first retention case 16 at a first axial end of the rotor assembly 10, and a second retention case 17 at a second axial end of the rotor assembly 10, spaced from the first retention case 16. As shown, the first and second retention cases 16, 17 can be axially spaced from one another by way of the rotor core 18, and can define respectively opposing axial ends of the rotor assembly 10. In one non-limiting example, one or both of the first or second retention cases 16, 17 can be formed of a high strength, heat resistant composition. For instance, compositions having high rigidity can be included. In one non-limiting example, one or both of the first or second retention cases 16, 17 can be formed of a nickel-alloy composition. In another non-limiting example, one or both of the first or second retention cases 16, 17 can be configured to be able to withstand heat generated in or at the set of rotor windings 24, such as in the example wherein the first or second retention cases 16, 17 are in a thermally conductive relationship with the set of rotor windings 24. In another non-limiting example, one or both of the first or second retention cases 16, 17 can be electrically insulated from the set of rotor windings 24, including, but not limited to, being formed from non-conductive composition, or being separated from the set of rotor windings 24 by a non-conductive or dielectric material, composition, layer, or the like.

Figure 2:
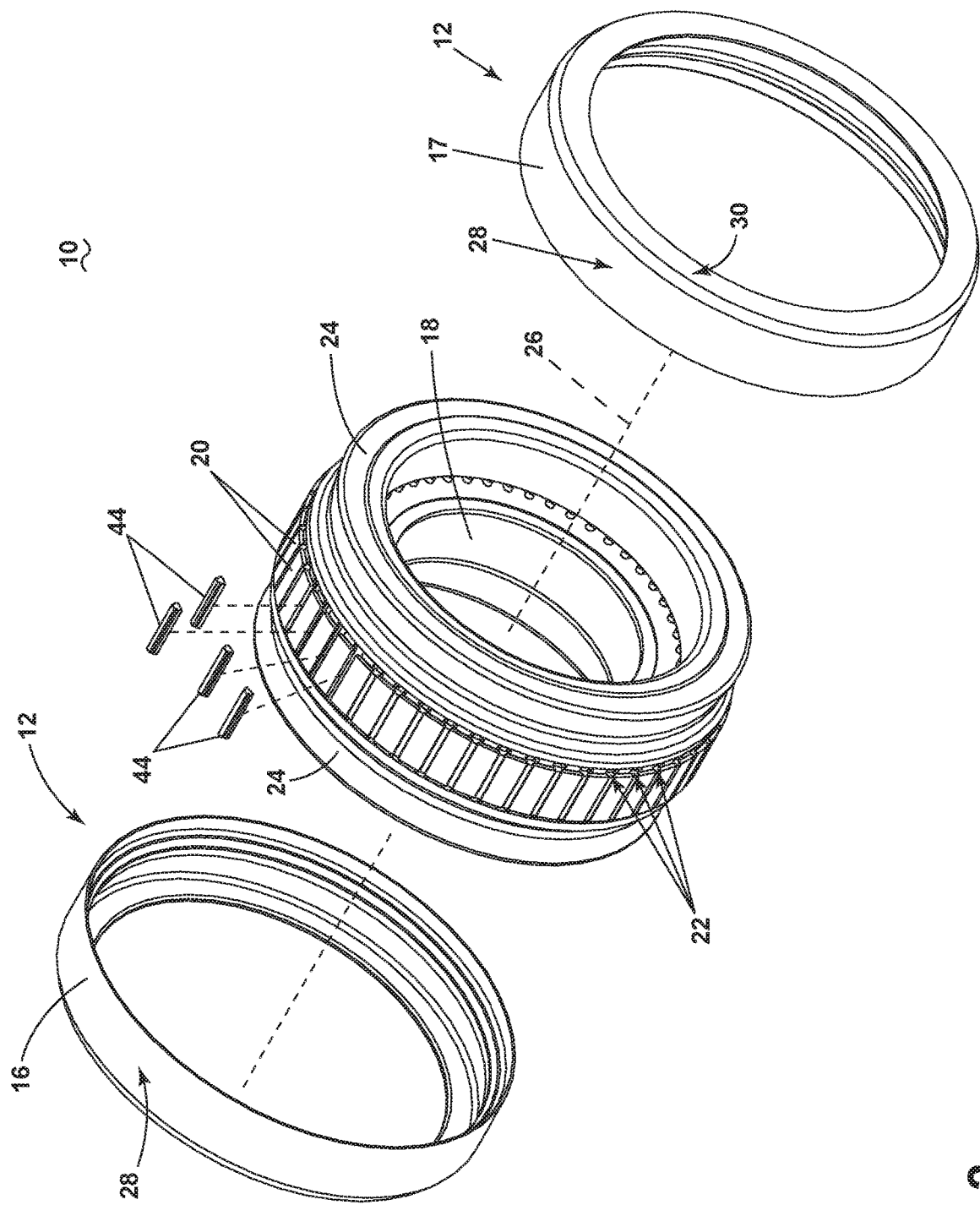
FIG. 2 is an exploded view of a rotor assembly of FIG. 1, in accordance with various aspects described herein.

FIG. 2 illustrates an axially-exploded view of the rotor assembly 10 of FIG. 1. As shown, each of the first and second retention cases 16, 17 can include a radially-facing portion 28 and an axially-facing portion 30. When assembled, the radially-facing portion 28 overlies (e.g. is radially outward relative to) the set of rotor windings 24, and the axially-facing portion 30 overlies (e.g. is axially outward relative to) the set of rotor windings 24. FIG. 2 further illustrates a set of winding retainers 44 that can be received within the set of slots 22 (e.g. between adjacent rotor posts 20) to retain the respective subset of rotor windings 24 that extend through the slot 22. As used herein, the subset of rotor windings 24 are radially retained, that is, they are prevented from being radially expelled outward from the set of slots 22 during rotation of the rotor assembly 10 about the longitudinal axis 26.

Figure 3:
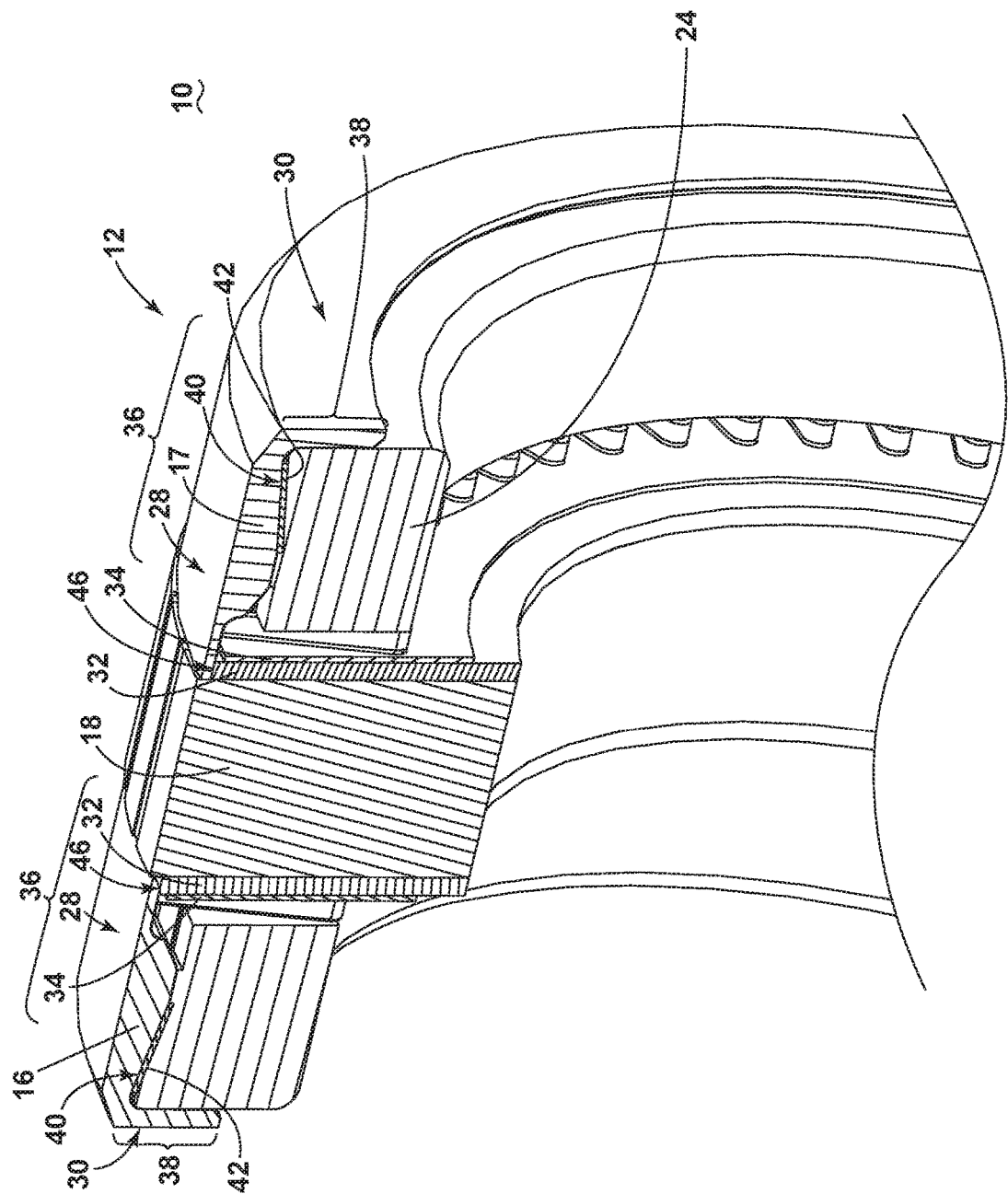
FIG. 3 is a cross-sectional view of the rotor assembly of FIG. 1, taken along line of FIG. 1, in accordance with various aspects described herein.

FIG. 3 illustrates a cross-section of the rotor assembly 10 of FIG. 1, taken along line III-III. As shown, non-limiting aspects of the disclosure can include end laminations 32 on one or both axial sides of the rotor core 18. The end laminations 32 can be formed of a rigid material, for example, including but not limited to, titanium. The end laminations 32 or the rotor core 18 can be configured, adapted, sized, or the like, such that the rotor core 18 extends radially outward further than the end laminations 32. Stated another way, the rotor core 18 can have a larger radius relative to the end laminations 32, to define a seat 46 at the radially outward surface of the end laminations 32. The rotor assembly 10 is further shown including an electrical insulator layer 34 positioned proximate to the end laminations 32, opposite the rotor core 18. In this sense, the electrical insulator layer 34 can electrically insulate the rotor core 18, the end laminations 32, or a combination thereof, from the set of rotor windings 24 that extend axially beyond the rotor core 18 (i.e. the rotor winding "end turns") or end laminations 32. While not shown, non-limiting aspects of the disclosure can be included wherein the set of rotor windings 24 can be further electrically insulated from the rotor 18 or end laminations 32 by way of slot 22 insulating liners.

The set of retention cases 12 can include first retaining portion 36 and a second retaining portion 38. The first retaining portion 36 can radially overlie the set of rotor windings 24 and extending along the radially-facing portion of the respective retention case 16, 17. In this sense, the first retaining portion 36 can contact, abut, or otherwise restrain, contain, or retain the set of rotor windings 24 extending axially beyond the rotor core 18 in a radial direction during rotation of the rotor assembly 10 about the longitudinal axis (not shown). Stated another way, the first retaining portion 36 ensures the set of rotor windings 24 remain radially in place during operation of the electric machine. As shown, at least a portion of the first retaining portion 36 can extend up to, or axially abut the rotor core 18. In this instance, an end portion of the first retaining portion 36, such as the end portion of the first retaining portion 36 distal from the second retaining portion 38, can be received in the seat 46 defined by the radially outward facing surface of the corresponding end lamination 32. In this sense, the first retaining portion 36 can be radially supported by the seat 46 and can operably pilot to the rotor core 18, the end laminations 32, or a subset thereof.

As used herein, "pilot" or "piloting" can refer to configuration or adaptions of the components described to ensure the components remain in a position relative to each other. For example, the first retaining portion 36 being radially supported by the seat 46 and the end lamination 32 and can ensure the set of retention cases 12 remain operably positioned relative to each other, such as concentric to each other. In this sense, the piloting of the first retaining portion 36, or an end thereof, with the seat 46 ensures that no radial movement of the set of retention cases 12 or set of rotor windings 24 will move beyond a desired or intended radius. For instance, it will be understood that the piloting of the first retaining portion 36, or an end thereof, with the seat 46 extends about the entire outer circumferential surface of the end laminations 32. Thus, a desired movement upward of the set of rotor windings 24 (with reference to the illustration of FIG. 3) by centripetal acceleration (e.g. during rotation of the rotor assembly 10) can result in the desired movement or force of the set of retention cases 12 upward as well. However, the desired movement of the set of retention cases 12 upward will be opposed by the piloting of the first retaining portion 36, or an end thereof, with the seat 46 at the diametric opposite portion of the rotor assembly 10 (not shown), preventing the desired movement. Thus, aspects of the disclosure can ensure the radial limitation or retention, and further ensure aspects of the rotor assembly 10 remain within a designed or desired radial limitation or envelop.

The set of retention cases 12 can also include the second retaining portion 38 axially overlying at least a portion of the set of rotor windings 24 and radially extending along the axially-facing portion of the respective retention case 16, 17. In this sense, the second retaining portion 38 can contact, abut, or otherwise restrain, contain, or retain the set of rotor windings 24 extending axially beyond the rotor core 18 in an axial direction during rotation of the rotor assembly 10 about the longitudinal axis (not shown). Stated another way, the second retaining portion 38 ensures the set of rotor windings 24 remain axially in place during operation of the electric machine. As shown, the second retaining portion 38 may axially overly only a subset or less than all of the axially-facing portion of the set of rotor windings 24. Non-limiting aspects of the disclosure can be included wherein the overlaying portion of the second retaining portion 38 can extend in a radial direction to overlay a sufficient portion of the set of rotor windings 24 to ensure the set of rotor windings 24 do not axially extend beyond, or do not axially "spill over" the second retaining portion 38 of the set of retention cases 12 during rotation of the rotor assembly 10 or electrical machine operation. Additional or less overlain portion of the set of rotor windings 24 is envisioned.

At least a portion 40 of the radially-facing inner surface of the first retaining portion 36 further includes an angled surface, wherein the angle of the surface of the portion 40 is offset relative to the longitudinal axis. As shown, the angle of the portion 40 can result in an increasing radial dimension along the surface portion 40 while moving away from the axial center of the rotor assembly 10 or the rotor core 18. Thus, when assembled, the surface portion 40 allows for a radially-wider grouping of the set of rotor windings 24 near the axial ends of the set of rotor windings 24, or a grouping of the set of rotor windings 24 at a further radius, compared with the radial width of the set of rotor windings 24 at the axial ends of the rotor core 18, the end laminations 32, or the like. In this sense, allowing for at least a portion of the windings 24 to extend radially outward, for example, by manual compaction of the set of rotor windings 24 during assembly, or by the centripetal acceleration experienced by the set of rotor windings 24 during rotation of the rotor assembly 10, results in that portion of the windings 24 to be forced into the angled corner of the set of retention cases between the first and second retaining portions 36, 38. The contacting with the angled surface portion 40 further provides at least friction at the angle, further restraining or retaining the set of rotor windings 24 from moving in an axial direction.

In another non-limiting example the angled surface portion 40 can further include a layer, coating, or the like, show schematically as layer 42, disposed on the angled surface portion 40, or positioned between the surface portion 40 and the set of rotor windings 24. In one non-limiting example, the layer 42 can comprise a dielectric, an electrical insulation layer, an epoxy, a varnish, an adhesive, the like, or a combination thereof. As described, aspects of the layer 42 can be adapted or configured to further provide retention of the set of rotor windings 24 with the angled surface portion 40. For example, an adhesive layer or epoxy layer can provide adhesive or semi-adhesive properties between the set of retention cases 12 and the respective set of rotor windings 24. In non-limiting examples, adhesive can ensure a known or predetermined adhesion or adhesion force between the set of retention cases 12 and the respective set of rotor windings 24, but other layering materials, such as epoxy, can provide an adhesion or adhesion force when the contacting is assembled while the epoxy is not fully set, dried, solidified, or the like. In another non-limiting example a varnish layering the set of rotor windings 24 can also provide an adhesion or adhesive force, as described. Additional aspects can be included.

Figure 4:
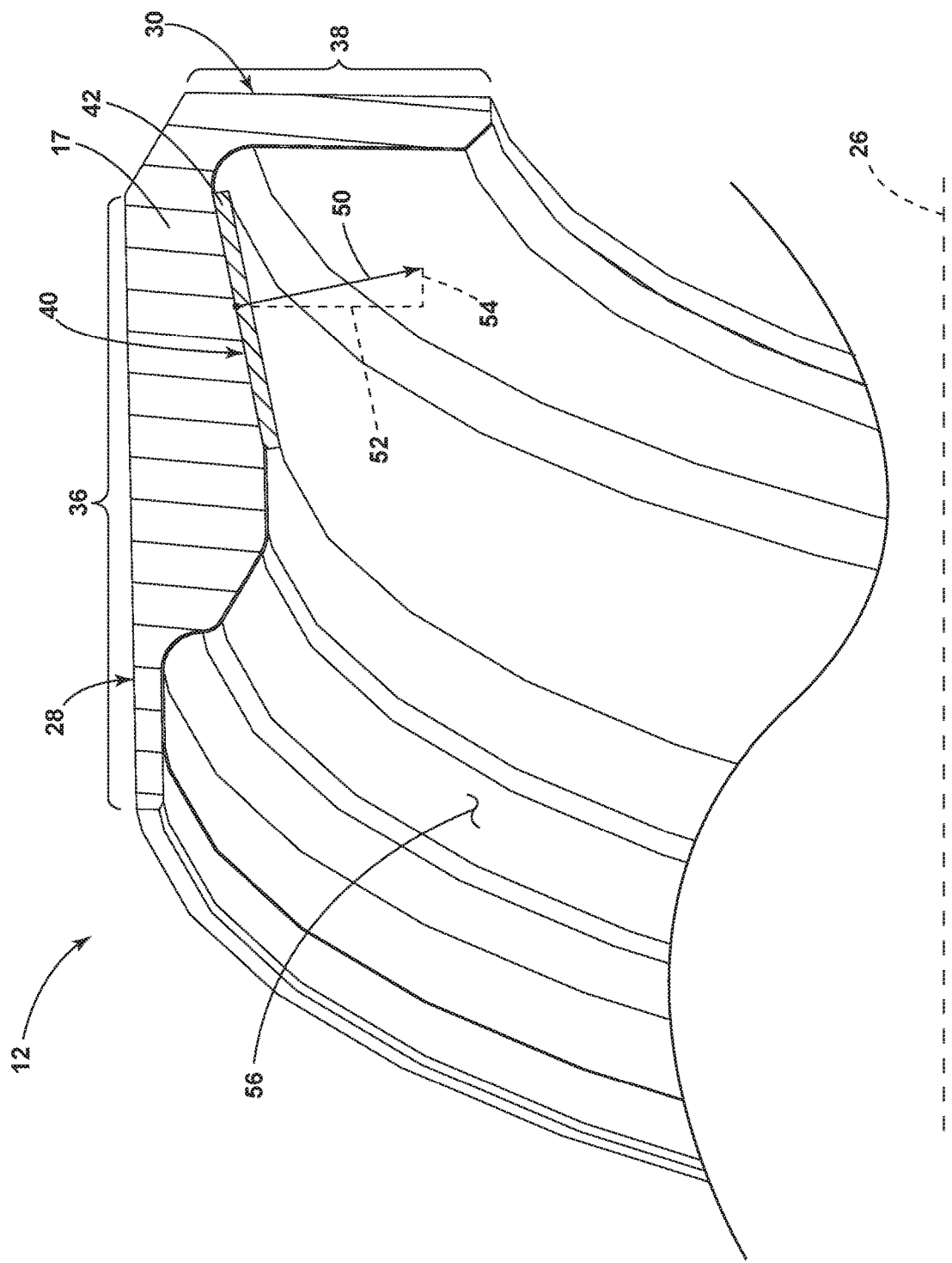
FIG. 4 is a zoomed cross-sectional view of a retention case of the rotor assembly of FIG. 1, in accordance with various aspects described herein.

Turning now to FIG. 4, a zoomed view of the second retention case 17 is shown for understanding. While the second retention case 17 is illustrated, it will be understood that features and description of the second retention case 17 is applicable to the first retention case 16 as well. As shown, the second retention case 17 includes an inner surface 56 that can be layered, coated, or otherwise adapted to prevent electrical contact between the set or rotor windings (not shown) and the second retention case 17. Furthermore, FIG. 4 further illustrates the angling of the surface portion 40 relative to the longitudinal axis 26. As shown, the surface portion 40 defines a normal force vector 50 demonstrating a normal force of the second retention case 17 or surface portion 40 acting upon the set of rotor windings (not shown) during rotation of the rotor assembly 10 about the longitudinal axis 26. As further shown, the normal force vector 50 includes a radial force vector component 52 extending in a purely radial direction, and an axial force vector component 54, wherein the axial force vector component 54 is parallel with the longitudinal axis 26. Thus, the presence of an axial force vector component 54 in the normal force vector 50 acts upon the set of rotor windings (not show) to affect an axial force that further ensures restraining or retaining the second retention case 17, the set of rotor windings (not shown), or a combination thereof, from moving in an axial direction.

Figure 5:
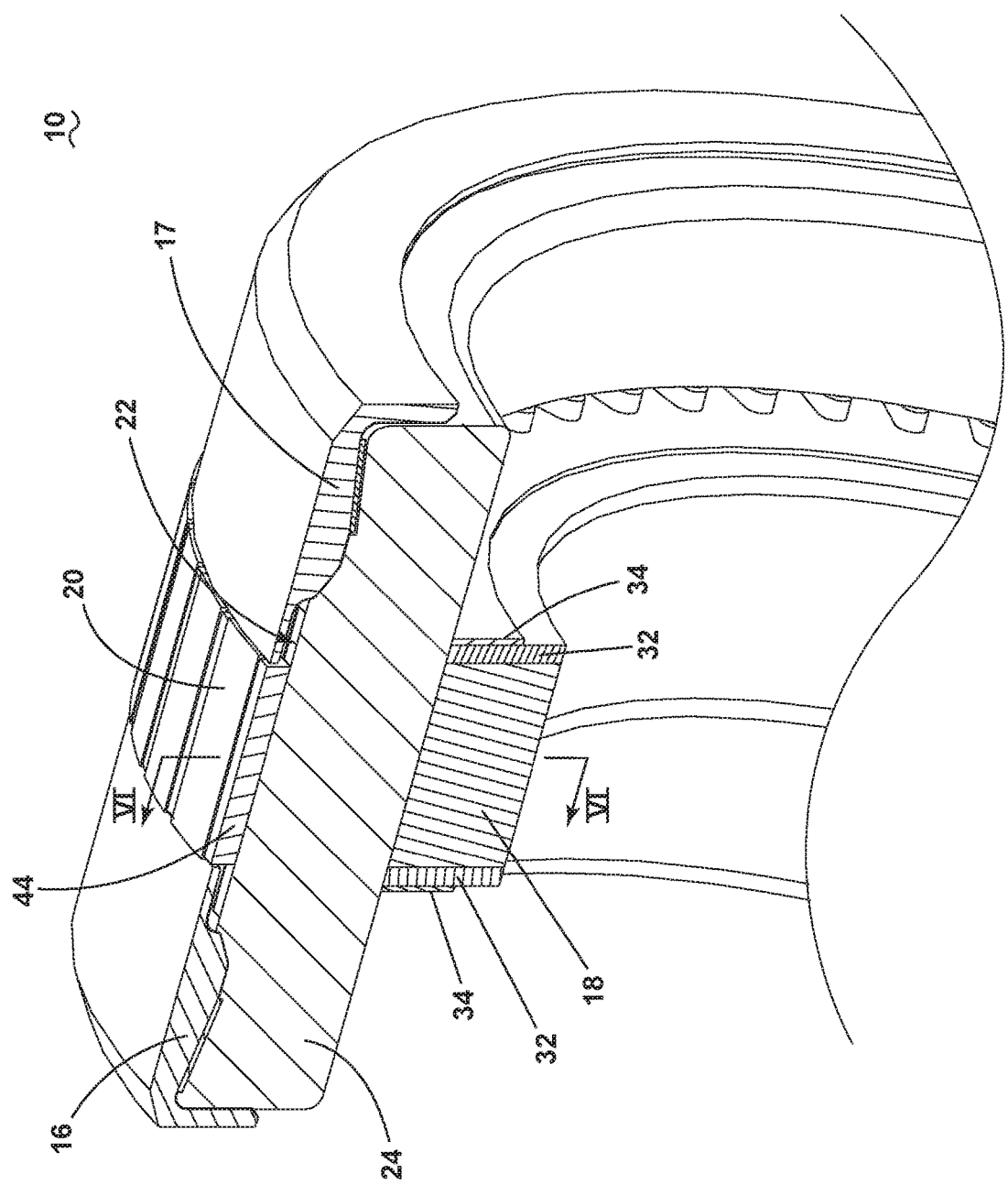
FIG. 5 is another cross-sectional view of the rotor assembly of FIG. 1, in accordance with various aspects described herein.

FIG. 5 illustrates a cross-sectional view similar to FIG. 3, but taken at a different cross section through a slot 22. As shown, the set of winding retainers 44 can overlay the set of rotor windings 24 and ensure the set of rotor windings 24 are not expelled out of the slot 22 during rotation of the rotor assembly 10.

Figure 6:
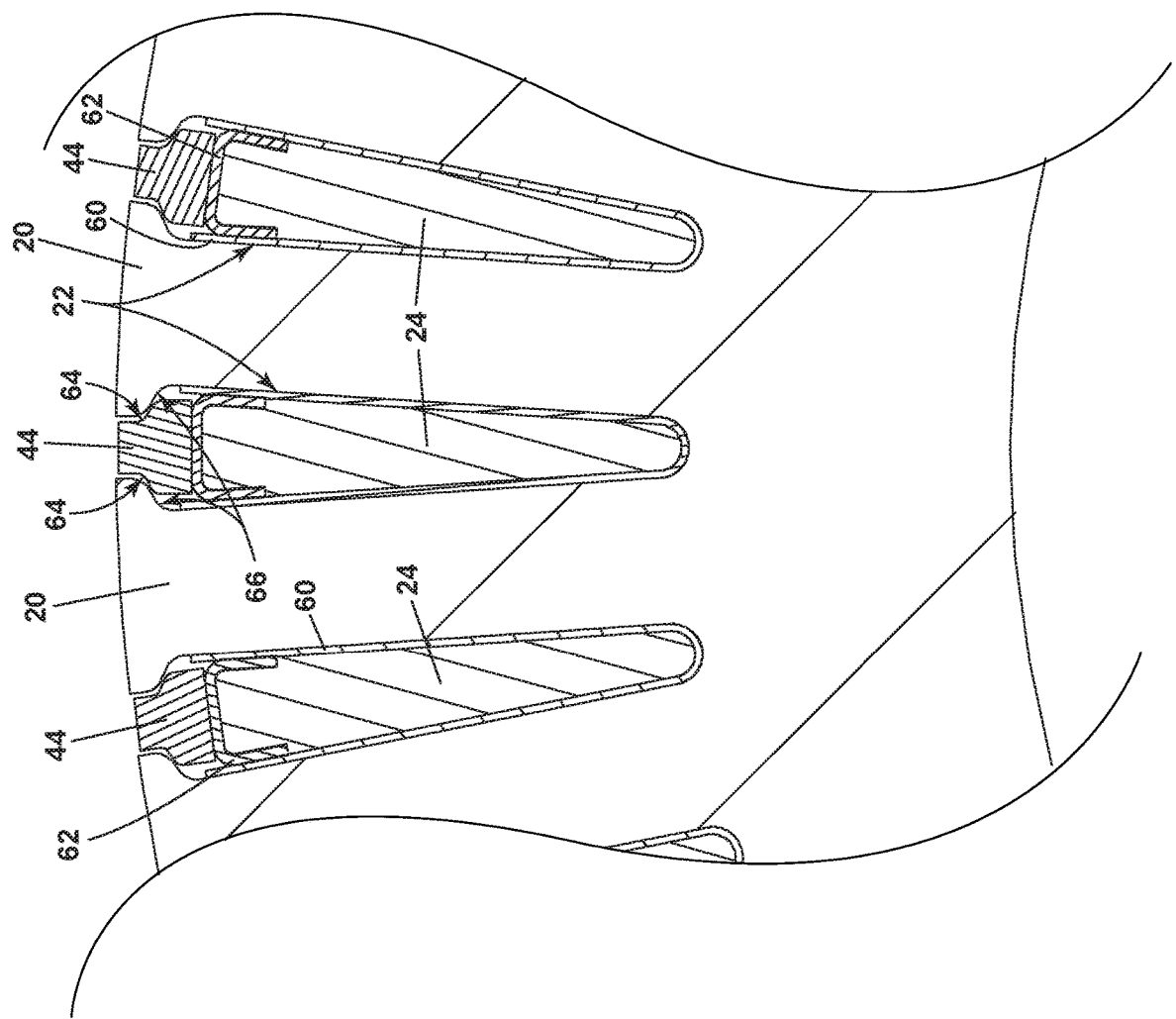
FIG. 6 is an axial cross-sectional view of the rotor assembly of FIG. 1, in accordance with various aspects described herein.

FIG. 6 illustrates an axial cross-sectional view of the rotor core 18 taken along line VI-VI of FIG. 5. As shown, non-limiting aspects of the slots 22 can include a first slot lining 60 lining the slot 22 sides, and can comprise a non-conductive material to prevent conduction between the set of rotor windings 24 and the rotor core 18 or the set or rotor posts 20. The slots can further include a second top slot lining 62, also comprising a non-conductive material, that can radially overly the set of rotor windings 24.

Additionally, FIG. 6 illustrates that the set of winding retainers 44, or top sticks, can include a geometric cross section having shoulders 64 that are adapted or configured to underlie corresponding or matching circumferentially-extending protrusions 66 of the set of posts 20. The radial interaction of the shoulders 64 with the protrusions 66 ensure that the set of winding retainers 44, the set of rotor windings 24, or the like, will not be radially expelled outwards in response to the rotation of the rotor assembly 10 during operation. In one non-limiting example, the set of winding retainers 44 can comprise a glass laminate. In another non-limiting example, the set of winding retainers 44 can be assembled with the slot 22 by way of laterally receiving the set of winding retainers 44 in their respective slot 22, in a direction parallel with the longitudinal axis (not shown).

Aspects of the disclosure can also include a method of forming a rotor core 18 or rotor assembly 10, as described herein.

Many other possible aspects and configurations in addition to that shown in the above figures are contemplated by the present disclosure. Additionally, the design and placement of the various components rearranged such that a number of different configurations could be realized.

The aspects disclosed herein provide a rotor assembly configured or adapted to retain the set of rotor windings during rotation of the rotor assembly. The technical effect is that the above described aspects enable the retention or retaining of the set of rotor windings in both a predetermined radial and axial envelope. One advantage that can be realized in the above aspects is that the above described aspects enable the piloting feature to allow the set or rotor windings, the retention cases, and the like, to stay centered with respect to the rotor core material and also to the longitudinal axis. Conventional rotor assemblies can shift radially under operation. This shift can cause imbalance issues and potential rubbing of the rotor assembly relative to another annular component, such as a housing or the stator. The piloting aspects incorporate a slight interference at installation to the rotor core end laminations. The end lamination allows for proper guiding and support of the set of retention cases through the piloting aspects.

Another advantage of the disclosure can include the second retaining portion 38 provided on the end of each retention case to provide support for the set of rotor winding end turns in the outboard (axial) direction. In larger machines and larger end turn windings extending axially outside of the rotor core, there is more risk of the large coils moving axially (or outboard) away from the core. While the major forces on the end turns are in a radial direction, there is a force component that wants to move the rotor winding end turns over the edge of conventional retention cases or bands. When the end turns move over the edge of conventional retention cases, the rotor assembly can become extremely unbalanced and cause a contacting of the rotor with another component. Aspects of the disclosure prevents the winding end turns from going over the edge of the band.

Yet another advantage of the disclosure can include that the inner diameter of the retention case design has a built in angled feature or surface which maintains the axial positioning of the retention case during operation. Compression of the rotor windings into this recessed area maintains an axial force inward (e.g. toward the rotor core) on the retention cases. In addition, the more centrifugal load on the rotor windings, the more force is generated onto the band to retention case it inward. This prevents the retention case from moving axially off of the rotor assembly or seat.

Yet another advantage of the disclosure can include that the use of a formed top stick retaining the rotor windings in the slot. This top stick is made from a much harder material than conventional top sticks and prevents movement or migration of the coil wires within, or out of, the slot. Aspects of the disclosure can result in additional rotor windings per slot, or rotation of the rotor assembly at higher speeds without the top stick migrating into the rotating air gap between the rotor assembly and a stator component due to centrifugal loading of the rotor windings onto the top stick. The configuration or shaping and material combination of the top stick described herein prevent movement of the wires under the aforementioned loading conditions.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor assembly for an electric machine, comprising:
a cylindrical rotor core defining a radially-facing seat and including a longitudinal axis of rotation;
a set of posts extending radially outward from the rotor core defining a set of slots between adjacent posts;
a set of windings formed by conductive wire wound in the set of slots having end turns extending axially beyond the rotor core; and
a pair of retention cases, each of the retention cases defining a first retaining portion radially overlying the end turns and a second retaining portion axially overlying at least an axially-facing portion of the end turns the first retaining portion having an inner surface portion having an offset angle relative to the longitudinal axis, wherein an end portion of the first retaining portion of each of the retention cases is received by the seat;
wherein a piloting of the first retaining portion of the retention case prevents imbalance of the set of windings during a rotation of the rotor assembly, by the seat ensuring there is no radial movement of the retention case; and
wherein the inner surface portion is angled such to include an increasing radial dimension along the inner surface portion while moving away from an axial-center of the cylindrical rotor core.

2. The rotor assembly of claim 1 wherein the second retaining portion axially overlies a predetermined axially-facing portion of the end turns such that the end turns do not move axially outward from the rotor assembly over the second retaining portion.

3. The rotor assembly of claim 1 wherein the rotor core further includes an end lamination defining the radially-facing seat.

4. The rotor assembly of claim 1 wherein the end of the first retaining portion is distal from the second retaining portion.

5. The rotor assembly of claim 1 wherein the retention case at a first circumferential position prevents a radial imbalance of the set of windings at a diametric opposite portion of the rotor assembly.

6. The rotor assembly of claim 1 wherein the inner surface portion provides for a grouping of the end turns at a further radius due to centripetal acceleration experienced by the end turns during rotation of the rotor assembly.

7. The rotor assembly of claim 1 wherein the inner surface portion defines a normal force vector experienced by the end turns during rotation of the rotor assembly, wherein the normal force vector includes a radial force vector component and an axial force vector component.

8. The rotor assembly of claim 1 further comprising a layer disposed between the inner surface portion and the end turns, wherein the layer defines an adhesion force between the inner surface portion and the end turns.

9. The rotor assembly of claim 8 wherein the layer is an adhesive, a varnish, or an epoxy.

10. The rotor assembly of claim 9 wherein the varnish or the epoxy is disposed between the inner surface portion and the end turns prior to the varnish or the epoxy being fully set and then allowing the varnish or the epoxy to fully set, and wherein the adhesion force is defined by allowing the varnish or the epoxy to fully set.

11. The rotor assembly of claim 1 wherein a compression of the end turns toward the inner surface portion during rotation of the rotor assembly generates an axial force directed at least partially axially inward toward the rotor core.

12. The rotor assembly of claim 11 wherein the generated axial force ensures the retention case remains received by the seat.

13. The rotor assembly of claim 1 wherein compression of the end turns toward the inner surface portion due to radially outward forces generated during rotation of the rotor assembly generates an axial force on the retention case due to the offset angle, the axial force being directed axially inward toward the rotor core, thereby to keep the retention case engaged within the seat.

* * * * *